(12) United States Patent
Nakagawa et al.

(10) Patent No.: US 11,218,768 B2
(45) Date of Patent: *Jan. 4, 2022

(54) INFORMATION PROCESSING DEVICE, INFORMATION PROCESSING METHOD, AND PROGRAM

(71) Applicant: SONY CORPORATION, Tokyo (JP)

(72) Inventors: Takaaki Nakagawa, Kanagawa (JP); Rio Yamasaki, Tokyo (JP); Masafumi Kakisaka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/894,263

(22) Filed: Jun. 5, 2020

(65) Prior Publication Data

US 2020/0304869 A1    Sep. 24, 2020

Related U.S. Application Data

(63) Continuation of application No. 15/529,289, filed as application No. PCT/JP2015/082551 on Nov. 19, 2015, now Pat. No. 10,721,525.

(30) Foreign Application Priority Data

Dec. 3, 2014  (JP) ................................. 2014-245311

(51) Int. Cl.
*H04N 21/45*    (2011.01)
*H04N 21/442*   (2011.01)
(Continued)

(52) U.S. Cl.
CPC ....... *H04N 21/44218* (2013.01); *G06F 13/00* (2013.01); *G06K 9/00335* (2013.01);
(Continued)

(58) Field of Classification Search
None
See application file for complete search history.

(56) References Cited

U.S. PATENT DOCUMENTS 8,955,021 B1 * 2/2015 Treder ............... H04N 21/4722
 725/93
10,085,064 B2 * 9/2018 Danker .................. G06T 11/00
(Continued)

FOREIGN PATENT DOCUMENTS

CN    102170591 A    8/2011
EP      2141836 A2   1/2010
(Continued)

OTHER PUBLICATIONS

Apr. 24, 2018, European Search Report issued for related EP Application No. 15864577.0.
(Continued)

*Primary Examiner* — Gims S Philippe
*Assistant Examiner* — Charles N Hicks
(74) *Attorney, Agent, or Firm* — Paralus Law Group, PLLC

(57) ABSTRACT

The present disclosure relates to an information processing device, an information processing method, and a program enabling an enhanced sense of unity between a performer and a viewer. The information processing device includes a viewer information acquisition unit that acquires specific viewer information input from a viewer who views a distributed moving image, a performer information acquisition unit that acquires specific performer information input from a performer who performs in the moving image, an emotion recognition unit that recognizes an emotion on a basis of at least one of the viewer information and the performer information, and a control unit that controls an addition of an effect based on the emotion. The present technology is (Continued)

applicable to a distribution system that distributes moving images, for example.

20 Claims, 9 Drawing Sheets

(51) Int. Cl.
    *H04N 21/234* (2011.01)
    *H04N 21/258* (2011.01)
    *G06F 13/00* (2006.01)
    *H04N 21/44* (2011.01)
    *H04N 21/439* (2011.01)
    *G06K 9/00* (2006.01)

(52) U.S. Cl.
    CPC ......... *H04N 21/234* (2013.01); *H04N 21/258* (2013.01); *H04N 21/4394* (2013.01); *H04N 21/44* (2013.01); *H04N 21/44008* (2013.01); *H04N 21/44213* (2013.01); *H04N 21/4532* (2013.01)

(56) References Cited

U.S. PATENT DOCUMENTS

| | | | |
|---|---|---|---|
| 10,721,525 B2* | 7/2020 | Nakagawa | H04N 21/234 |
| 2007/0271580 A1 | 11/2007 | Tischer et al. | |
| 2009/0163262 A1* | 6/2009 | Kang | A63F 13/10 |
| | | | 463/8 |
| 2009/0300475 A1 | 12/2009 | Fink et al. | |
| 2011/0096094 A1 | 4/2011 | Seol | |
| 2011/0209066 A1* | 8/2011 | Sakata | H04N 7/17318 |
| | | | 715/735 |
| 2011/0214141 A1* | 9/2011 | Oyaizu | H04N 21/44213 |
| | | | 725/12 |
| 2012/0075530 A1* | 3/2012 | Miyazaki | H04N 21/44218 |
| | | | 348/552 |
| 2014/0033250 A1 | 1/2014 | Kennedy | |
| 2014/0192134 A1* | 7/2014 | Jung | H04N 7/147 |
| | | | 348/14.02 |
| 2015/0350729 A1 | 12/2015 | Reynolds | |
| 2016/0066036 A1* | 3/2016 | Felt | H04N 21/4542 |
| | | | 386/241 |

FOREIGN PATENT DOCUMENTS

| | | |
|---|---|---|
| EP | 2753076 A2 | 7/2014 |
| GB | 2422454 A | 7/2006 |
| JP | 2005-150795 | 6/2005 |
| JP | 2005-303722 | 10/2005 |
| JP | 2007-097047 A | 4/2007 |
| JP | 2009-182410 | 8/2009 |
| JP | 2009-188876 | 8/2009 |
| JP | 2010-021632 A | 1/2010 |
| JP | 2011-166572 A | 8/2011 |
| JP | 2011-182109 | 9/2011 |
| JP | 2012-009957 A | 1/2012 |
| JP | 2013-037670 | 2/2013 |
| JP | 2013-070155 | 4/2013 |
| JP | 2014-212490 | 11/2014 |

OTHER PUBLICATIONS

Jun. 5, 2019, Chinese Office Action issued for related CN Application No. 201580063842.4.

Mar. 31, 2020, Japanese Decision of Dismissal of Amendment issued for related JP application No. 2016-562379.

Mar. 31, 2020, Japanese Office Action issued for related JP application No. 2016-562379.

* cited by examiner

FIG. 7
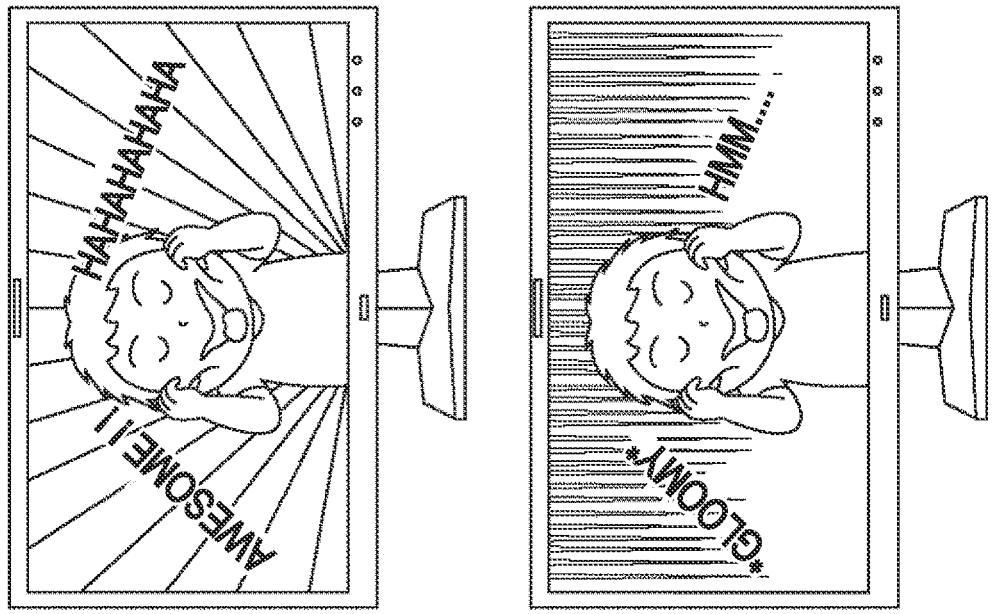
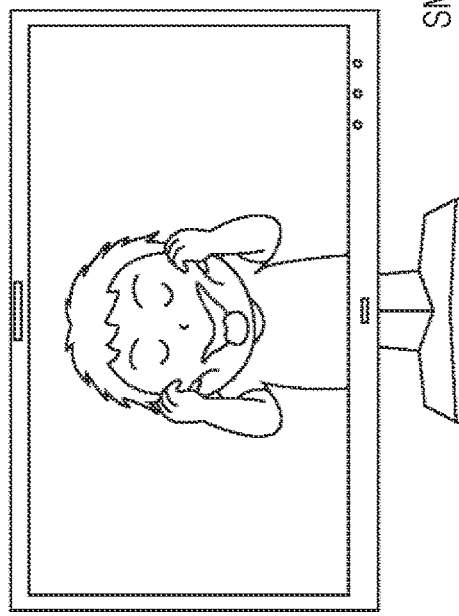

INFORMATION PROCESSING DEVICE, INFORMATION PROCESSING METHOD, AND PROGRAM

CROSS REFERENCE TO PRIOR APPLICATION

This application is a continuation of U.S. patent application Ser. No. 15/529,289 (filed on May 24, 2017), which is a National Stage Patent Application of PCT International Patent Application No. PCT/JP2015/082551 (filed on Nov. 19, 2015) under 35 U.S.C. § 371, which claims priority to Japanese Patent Application No. 2014-245311 (filed on Dec. 3, 2014), which are all hereby incorporated by reference in their entirety.

TECHNICAL FIELD

The present disclosure relates to an information processing device, an information processing method, and a program, and more particularly, to an information processing device, an information processing method, and a program enabling an enhanced sense of unity between a performer and a viewer.

BACKGROUND ART

Recently, devices such as web cameras and the cameras built into smartphones are being used to record a moving image of oneself, which may then be uploaded to a video distribution site or streamed over the Internet.

Also, for some time, a distribution system has been operated in which information such as comments from viewers is inserted in real-time with respect to a performer distributing a moving image, thereby enabling the performer to obtain viewer feedback.

For example, Patent Literature 1 discloses a stage direction system that controls stage direction on the basis of comments from viewers. Also, Patent Literature 2 discloses a comment distribution system that extracts a specific keyword included in comments from viewers, and displays a moving image embellished by a display method associated with the specific keyword. Also, Patent Literature 3 discloses a communication system that imparts a sense of unity by aggregating information such as biological information or emotional information about a performer and biological information or emotional information about an audience, and distributing such information constructed as scene information.

CITATION LIST

Patent Literature

Patent Literature 1: JP 2013-37670A
Patent Literature 2: JP 2014-212490A
Patent Literature 1: JP 2005-303722A

DISCLOSURE OF INVENTION

Technical Problem

However, there is demand for a distribution system enabling an enhanced sense of unity that further improves entertainment value and shared excitement between a performer and a viewer over the distribution systems as discussed above.

The present disclosure has been devised in light of such circumstances, and is configured to further enhance a sense of unity between a performer and a viewer.

Solution to Problem

According to an aspect of the present disclosure, there is provided an information processing device, including: a viewer information acquisition unit that acquires specific viewer information input from a viewer who views a distributed moving image; and a control unit that controls an addition of an effect based on the viewer information acquired by the viewer information acquisition unit.

According to an aspect of the present disclosure, there is provided a program causing a computer to execute information processing including: acquiring specific viewer information input from a viewer who views a distributed moving image; and controlling an addition of an effect based on the acquired viewer information.

In one aspect of the present disclosure, specific viewer information input by a viewer viewing a distributed moving image is acquired, and the addition of an effect based on the viewer information is controlled.

Advantageous Effects of Invention

According to an aspect of the present disclosure, it is possible to enhance a sense of unity between a performer and a viewer.

BRIEF DESCRIPTION OF DRAWINGS

FIG. 7 is a diagram explaining an example of selecting a background effect on the basis of the intensity of viewer laughter.

MODE(S) FOR CARRYING OUT THE INVENTION

Hereinafter, specific embodiments applying the present technology will be described in detail with reference to the drawings.

Figure 1:
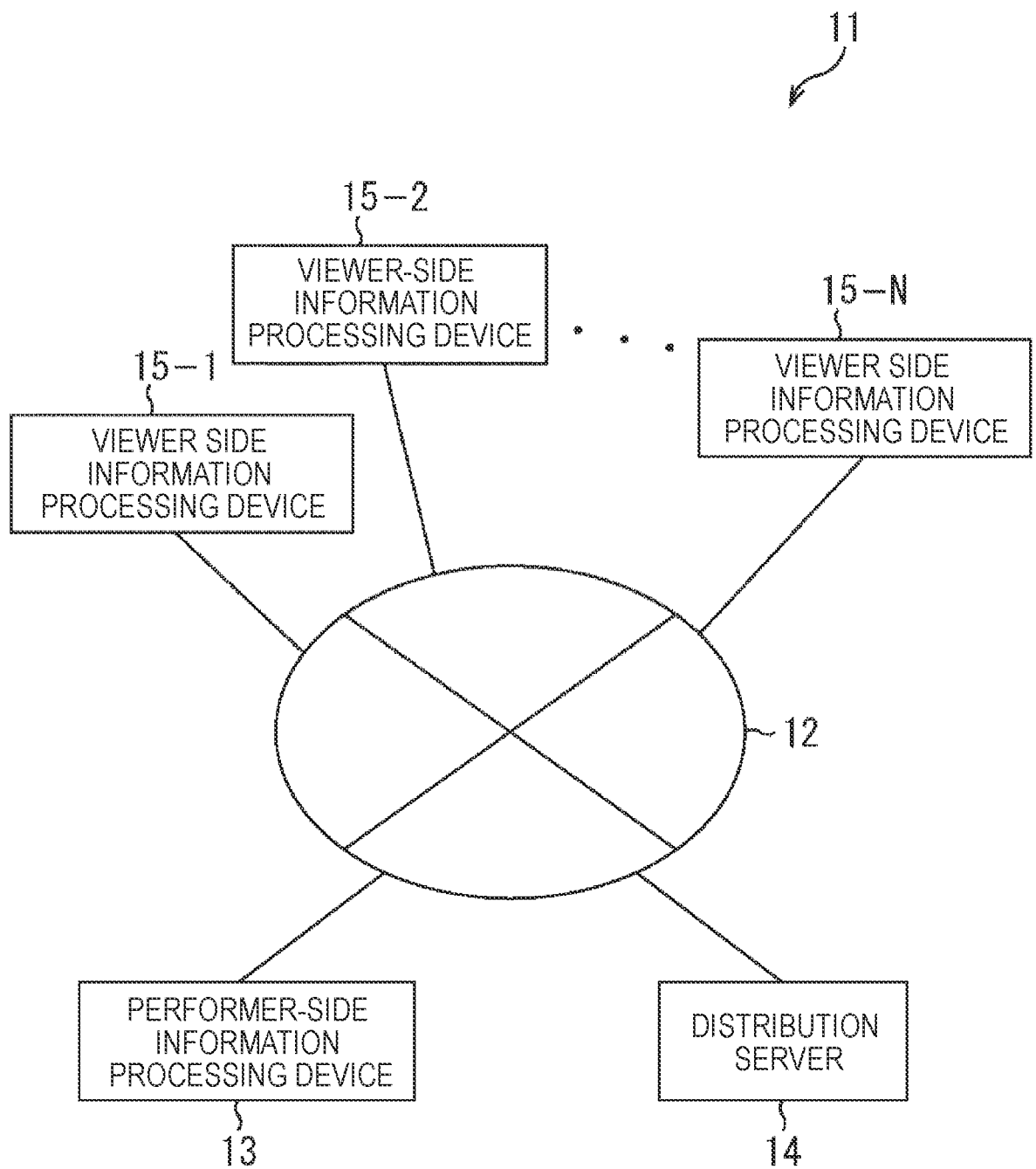
FIG. 1 is a block diagram illustrating an exemplary configuration of an embodiment of a distribution system applying the present technology.

FIG. 1 is a block diagram illustrating an exemplary configuration of an embodiment of a distribution system applying the present technology.

As illustrated in FIG. 1, the distribution system 11 includes a performer-side information processing device 13, a distribution server 14, and N (multiple) viewer-side information processing devices 15-1 to 15-N, which are connected to each other via a network 12 such as the Internet.

As discussed later with reference to FIG. 2, the performer-side information processing device 13 continuously transmits a moving image depicting the performer to the distribution server 14 via the network 12.

The distribution server 14 distributes the moving image transmitted from the performer-side information processing device 13 to the viewer-side information processing devices 15-1 to 15-N via the network 12. At this point, for example, the distribution server 14 is able to perform image processing of overlaying a flow of comments transmitted from the viewer-side information processing devices 15-1 to 15-N onto the distributed moving image, and distributing the moving image subjected to such image processing.

The viewer-side information processing devices 15-1 to 15-N display a moving image distributed from the distribution server 14 via the network 12, enabling a viewer to view the moving image. Additionally, the viewer-side information processing devices 15-1 to 15-N transmit, to the distribution server 14, information such as comments input by each viewer in response to the moving image. Subsequently, these comments are transmitted to the performer-side information processing device 13 via the distribution server 14.

In the distribution system 11 configured in this way, the performer-side information processing device 13 is able to modify an effect (stage effect) with respect to the distributed moving image, on the basis of the comments input by viewers in response to the moving image. Consequently, it is possible to distribute a moving image with improved entertainment value, in which the performer and viewers become excited together.

Figure 2:
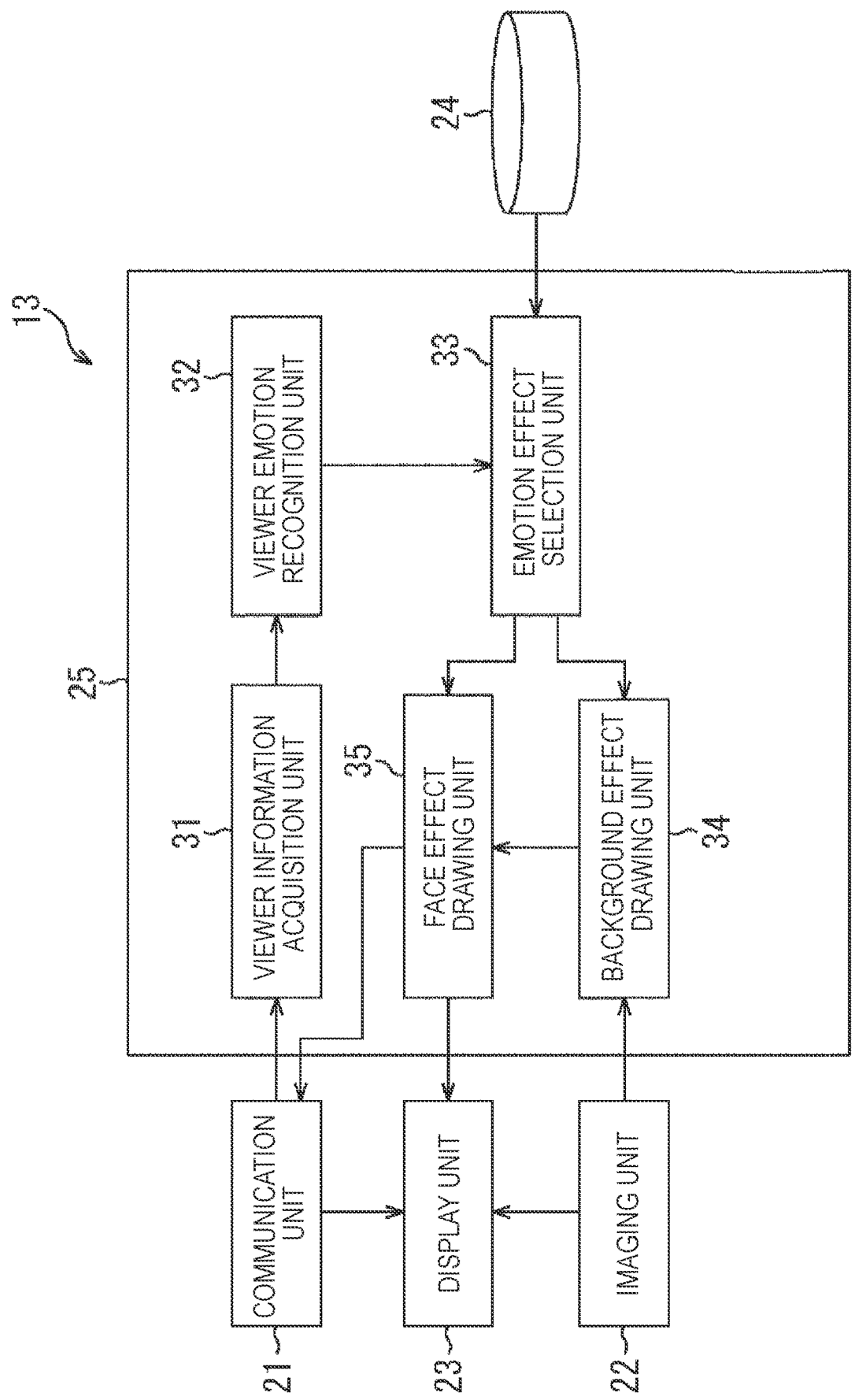
FIG. 2 is a block diagram illustrating a first exemplary configuration of a performer-side information processing device.

Next, FIG. 2 is a block diagram illustrating a first exemplary configuration of the performer-side information processing device 13.

As illustrated in FIG. 2, the performer-side information processing device 13 is equipped with a communication unit 21, an imaging unit 22, a display unit 23, a storage unit 24, and an image processing unit 25.

The communication unit 21 conducts communication via the network 12 in FIG. 1. For example, the communication unit 21 transmits a moving image subjected to image processing in the image processing unit 25 to the distribution server 14. Additionally, the communication unit 21 acquires comments transmitted from the viewer-side information processing devices 15-1 to 15-N, and supplies the comments to the image processing unit 25 as viewer input information. Note that the following describes comments as viewer input information, but besides textual information such as comments, information such as viewer speech information and facial expressions, or the number and speed of operations performed on an operating device of the viewer-side information processing device 15 (for example, the number or speed of key presses on a keyboard) may also be used as the viewer input information.

The imaging unit 22 includes components such as an image sensor and an optical lens, for example, and supplies to the image processing unit 25 a moving image depicting one or multiple performers as the photographic subject. Additionally, the imaging unit 22 is able to supply the imaged moving image to the display unit 23, and cause the display unit 23 to display a moving image not subjected to image processing by the image processing unit 25.

The display unit 23 is made up of a liquid crystal display or an organic electroluminescence (EL) display, for example, and displays images such as a moving image subjected to image processing by the image processing unit 25, or a moving image imaged by the imaging unit 22. Also, the display unit 23 is able to display a moving image which is supplied from the distribution server 14 via the communication unit 21, and which has been subjected to image processing (overlaid with comments) in the distribution server 14.

The storage unit 24 includes components such as a hard disk drive or semiconductor memory, and stores information such as images required when the image processing unit 25 performs image processing.

The image processing unit 25 recognizes viewer emotion on the basis of viewer input information supplied from the communication unit 21, and performs image processing that adds a specific effect consistent with the emotion to the moving image imaged by the imaging unit 22. Subsequently, the image processing unit 25 supplies the moving image with the added specific effect that is consistent with the viewer emotion to the display unit 23 for display, and also causes the moving image with the added effect to be transmitted to the distribution server 14 via the communication unit 21.

In addition, as illustrated in FIG. 2, the image processing unit 25 includes a viewer information acquisition unit 31, a viewer emotion recognition unit 32, an emotion effect selection unit 33, a background effect drawing unit 34, and a face effect drawing unit 35.

The viewer information acquisition unit 31 acquires comments from the viewer-side information processing devices 15-1 to 15-N supplied from the communication unit 21 as viewer information, and supplies the viewer information to the viewer emotion recognition unit 32.

Figure 3:
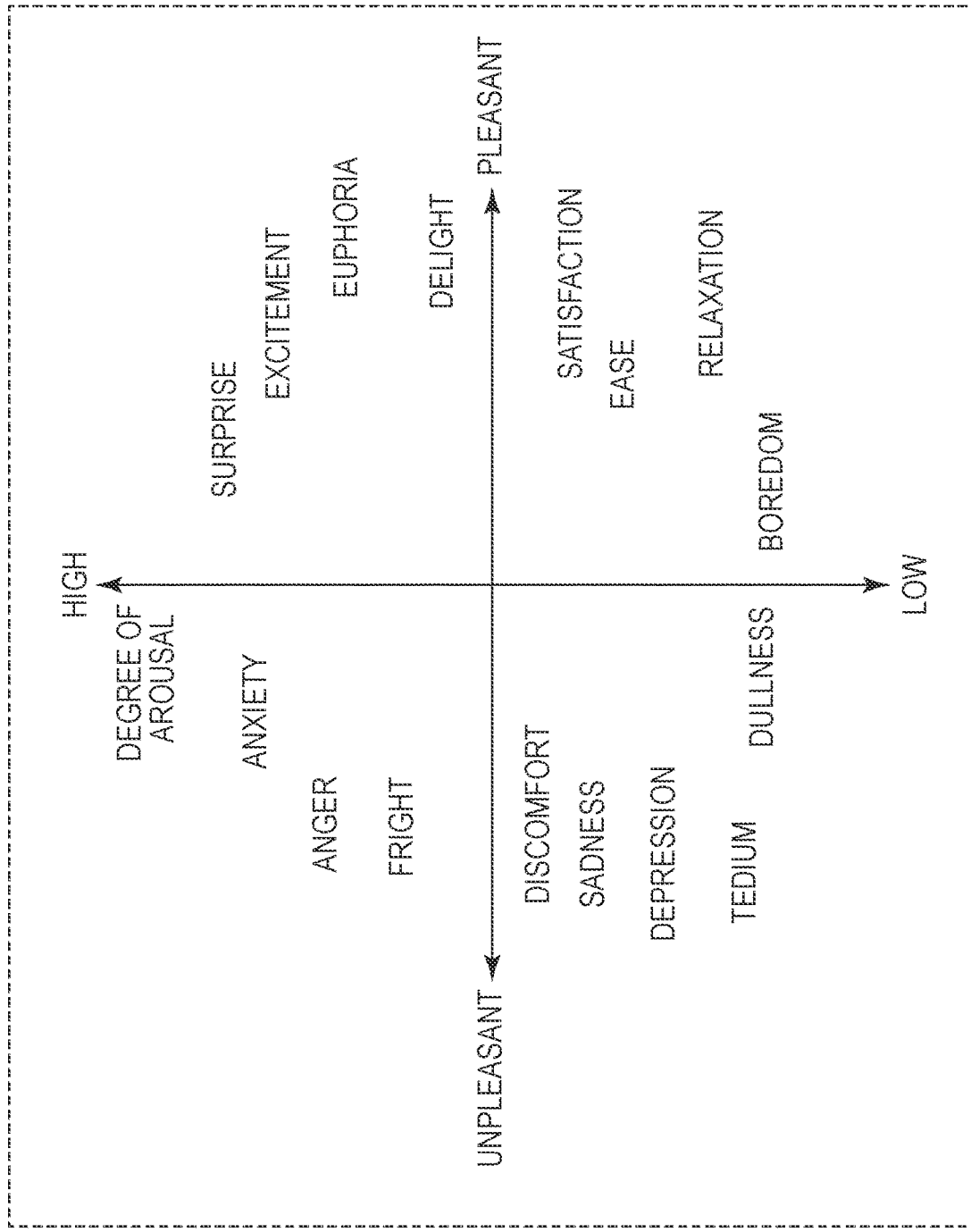
FIG. 3 is a diagram illustrating an emotion classification used when a viewer emotion recognition unit recognizes emotion.

The viewer emotion recognition unit 32 recognizes viewer emotion, on the basis of viewer information supplied from the viewer information acquisition unit 31. For example, the viewer emotion recognition unit 32 is able to recognize viewer emotion in accordance with an emotion classification (the Russell circumplex model of emotion) in which various emotions are classified as illustrated in FIG. 3.

For example, the viewer emotion recognition unit 32 stores in advance a large number of comments anticipated to be used as viewer information, and for these comments, associates a level indicating a high or low degree of arousal as well as a level indicating the pleasantness or unpleasantness of the emotion. Subsequently, the viewer emotion recognition unit 32 computes a distribution of comments in accordance with the level indicating the high or low degree of arousal as well as the level indicating the pleasantness or unpleasantness of the emotion associated the comments supplied from the viewer information acquisition unit 31, and recognizes the emotion classified at a position where a certain prescribed number of comments or more are distributed as the viewer emotion.

The emotion effect selection unit 33 selects an emotion affect in accordance with the viewer emotion recognized by the viewer emotion recognition unit 32 from among multiple emotion effects stored in the storage unit 24, and controls the addition of the effect with respect to the moving image. For example, in the storage unit 24, emotions to be recognized in the viewer emotion recognition unit 32 are associated with emotion effects, that is, images imparting an effect consistent with the associated emotion, and the emotion effect selection unit 33 is able to select an emotion effect in accordance with the correspondence relationship.

Additionally, an emotion effect includes a background effect displayed behind a performer depicted in the moving image, and a face effect displayed overlaid onto a viewer face depicted in the moving image. Consequently, the emotion effect selection unit 33 supplies the background effect drawing unit 34 with a background effect selected in accordance with the viewer emotion recognized by the viewer emotion recognition unit 32, and supplies the face effect drawing unit 35 with a similarly selected face effect.

The background effect drawing unit 34 performs image processing of cutting out a performer depicted in the moving image imaged by the imaging unit 22, and drawing a moving image in which the background effect supplied from the emotion effect selection unit 33 is composited behind the performer. Subsequently, the background effect drawing unit 34 supplies the face effect drawing unit 35 with the moving image in which the background effect is composited behind the performer.

The face effect drawing unit 35 conducts a face recognition process that recognizes the face of a performer depicted in the moving image supplied from the background effect drawing unit 34, and in accordance with the position and size of the face, adjusts the position and size of a face effect supplied from the emotion effect selection unit 33. Furthermore, the face effect drawing unit 35 conducts image processing that draws a moving image in which the position- and size-adjusted face effect is composited in the foreground of the moving image from the background effect drawing unit 34. Subsequently, the face effect drawing unit 35 supplies the moving image in which the background effect is composited behind the performer and the face effect is composited in front of the performer's face to the display unit 23 for display, and also causes the composited moving image to be transmitted to the distribution server 14 via the communication unit 21.

Since the performer-side information processing device 13 is configured as above and an emotion effect consistent with the viewer emotion may be selected, the sense of unity between a performer and a viewer may be enhanced.

Figure 4:
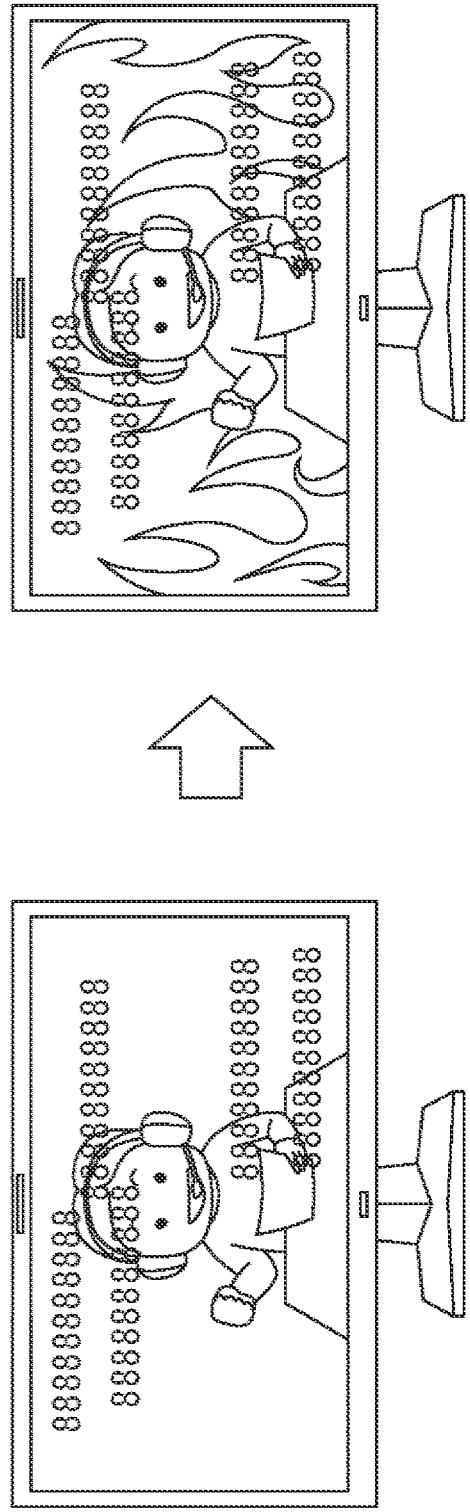
FIG. 4 is a diagram explaining an effect of image processing by an image processing unit.

Specifically, the distribution system 11 is able to distribute not a moving image of the related art as illustrated on the left side of FIG. 4, namely a moving image overlaid with a flow of comments from viewers, but instead a moving image as illustrated on the right side of FIG. 4, namely a moving image in which is drawn a background effect (an image of burning flames) that is consistent with a viewer emotion recognized on the basis of a large number of praising comments. In this way, by causing the viewer emotion to be reflected in the moving image, the sense of unity between a performer and a viewer may be enhanced.

Figure 5:
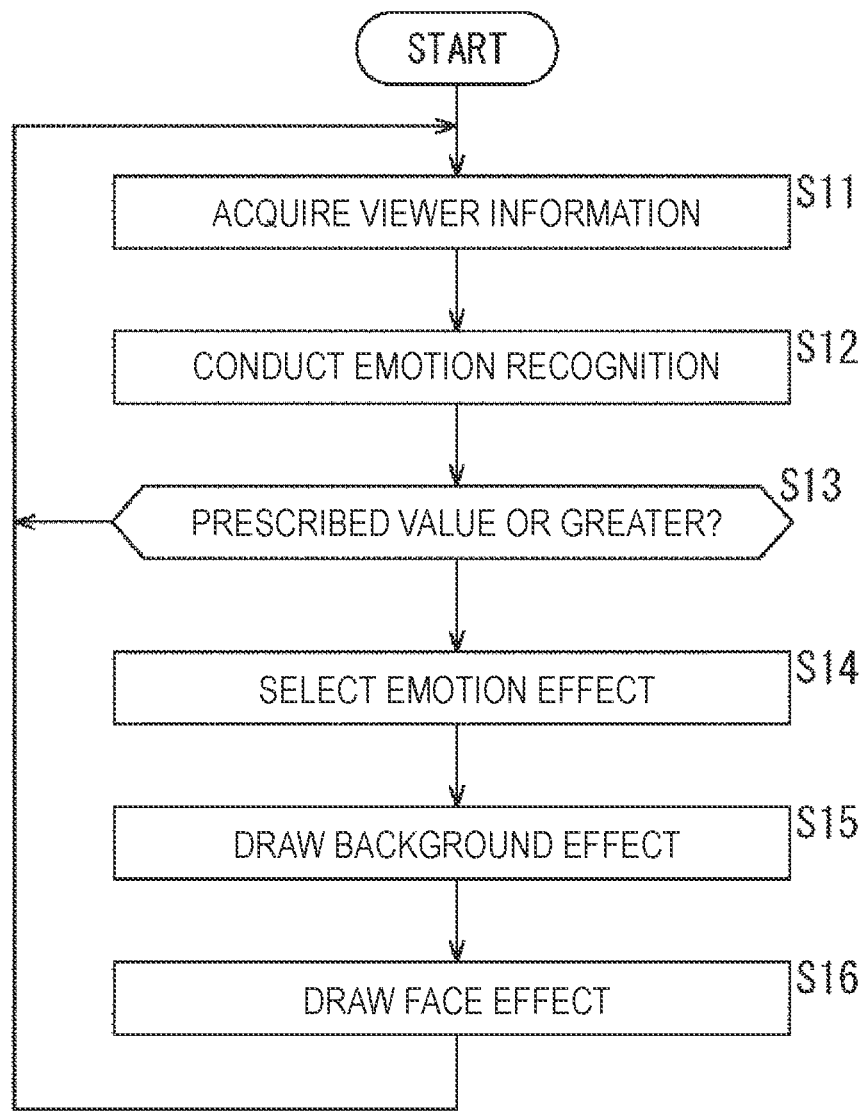
FIG. 5 is a flowchart explaining image processing.

Next, FIG. 5 is a flowchart explaining image processing conducted in the image processing unit 25.

For example, a process is started when the performer performs an operation to start the distribution of a moving image from the performer-side information processing device 13. In step S11, the viewer information acquisition unit 31 acquires comments from the viewer-side information processing devices 15-1 to 15-N supplied from the communication unit 21 as viewer information, and supplies the viewer information to the viewer emotion recognition unit 32.

In step S12, the viewer emotion recognition unit 32 recognizes viewer emotion, on the basis of the viewer information supplied from the viewer information acquisition unit 31 in step S11.

In step S13, the viewer emotion recognition unit 32 determines whether or not the number of comments classified under any one emotion recognized in step S12 has become equal to or greater than a prescribed value. In step S13, if the viewer emotion recognition unit 32 determines that the number of comments classified under any one emotion has not become equal to or greater than the prescribed value, the process returns to step S11, and thereafter, a similar process is repeated.

On the other hand, if the viewer emotion recognition unit 32 determines that the number of comments classified under any one emotion has become equal to or greater than the prescribed value, the process proceeds to step S14. In this case, the viewer emotion recognition unit 32 recognizes the emotion equal to or greater than the prescribed value as viewer information, and supplies the viewer information to the emotion effect selection unit 33.

In step S14, the emotion effect selection unit 33 selects an emotion affect in accordance with the viewer emotion recognized by the viewer emotion recognition unit 32 from among multiple emotion effects stored in the storage unit 24. Subsequently, the emotion effect selection unit 33 supplies the background effect drawing unit 34 with the background effect of the selected emotion effect, while also supplying the face effect drawing unit 35 with the face effect.

In step S15, the background effect drawing unit 34 draws a moving image in which the background effect supplied from the emotion effect selection unit 33 in step S14 is composited behind the performer imaged by the imaging unit 22, and supplies the moving image to the face effect drawing unit 35.

In step S16, the face effect drawing unit 35 draws a moving image in which the face effect supplied from the emotion effect selection unit 33 in step S14 is composited in front of the face in the moving image supplied from the background effect drawing unit 34 in step S15. Subsequently, the face effect drawing unit 35 supplies the moving image to the display unit 23 for display while also transmitting the moving image to the distribution server 14 via the communication unit 21. After that, the process returns to step S11, and thereafter, a similar process is repeated.

Figure 6:
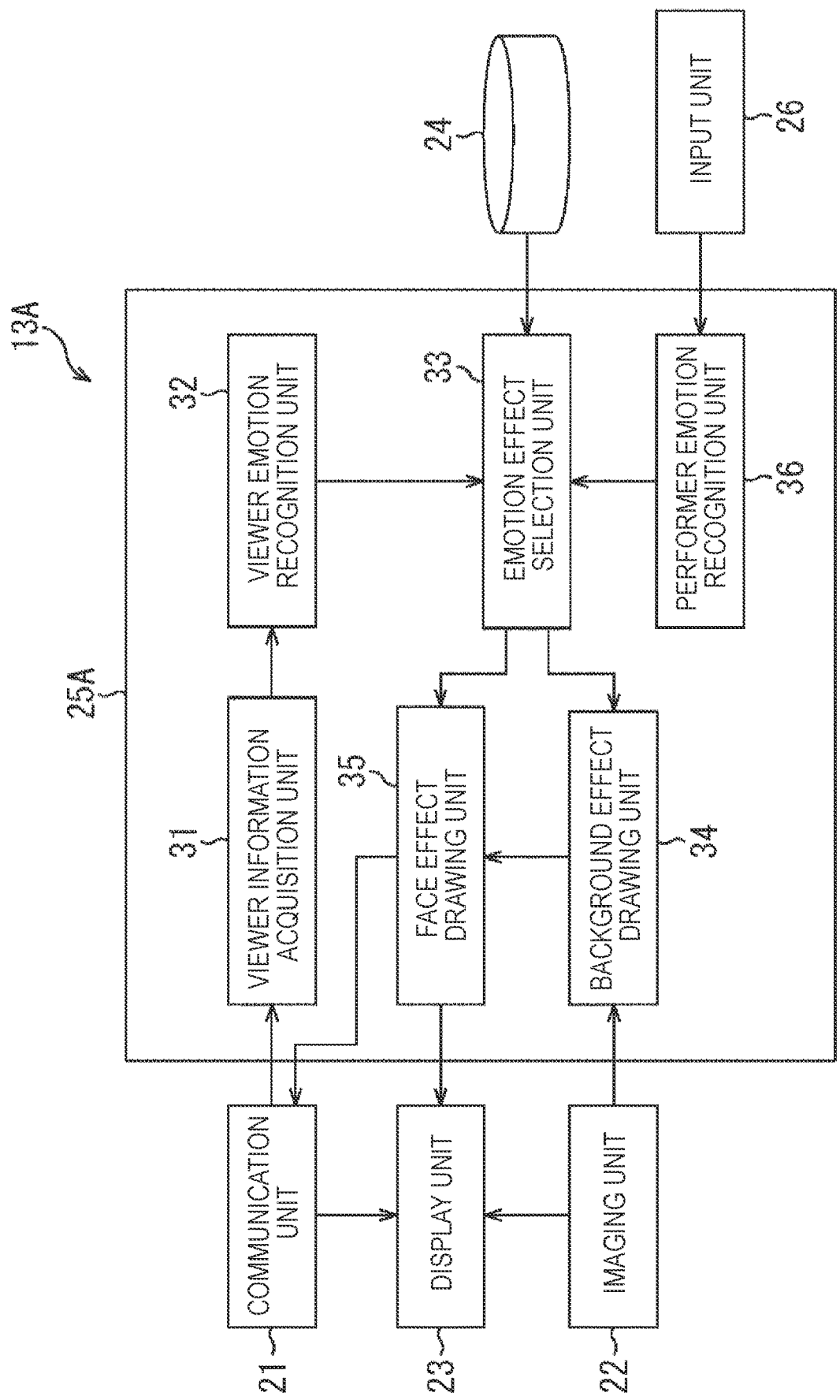
FIG. 6 is a block diagram illustrating a second exemplary configuration of a performer-side information processing device.

Next, FIG. 6 is a block diagram illustrating a second exemplary configuration of the performer-side information processing device 13.

In the performer-side information processing device 13A illustrated in FIG. 6, the same signs are used to denote the configuration shared in common with the performer-side information processing device 13 in FIG. 2, and detailed description thereof will be reduced or omitted. Namely, the performer-side information processing device 13A is equipped with the communication unit 21, the imaging unit 22, the display unit 23, and the storage unit 24, in common with the performer-side information processing device 13 in FIG. 2.

Meanwhile, the performer-side information processing device 13A has a different configuration from the performer-side information processing device 13 in FIG. 2 by being equipped with an input unit 26, while the image processing unit 25A includes, in addition to the viewer information acquisition unit 31, the viewer emotion recognition unit 32, the emotion effect selection unit 33, the background effect drawing unit 34, and the face effect drawing unit 35, a performer emotion recognition unit 36.

The input unit 26 is made up of components such as a keyboard, a microphone, or an imaging device, for example, and acquires information such as comments input by the performer, speech spoken by the performer, and the performer's facial expressions as performer information, and supplies the performer information to the performer emotion recognition unit 36 of the image processing unit 25A.

The performer emotion recognition unit 36 recognizes a performer emotion on the basis of the performer information supplied from the input unit 26, and supplies the recognized performer emotion to the emotion effect selection unit 33.

In the performer-side information processing device 13A configured in this way, the emotion effect selection unit 33 is able to select an emotion effect on the basis of both viewer emotion and performer emotion. Consequently, for example, when the viewer emotion and the performer emotion match, the emotion effect selection unit 33 is able to select an emotion effect with a bigger effect. As a result, the sense of unity between a performer and a viewer may be enhanced further. Note that the emotion effect selection unit 33 may also select an emotion effect on the basis of just the performer emotion.

Also, since the performer-side information processing device 13A uses performer emotion, when the performer does not want to generate excitement, for example, the performer emotion does not match with teasing comments input by a viewer, and thus it is possible to keep the viewer emotion from being reflected. In other words, in the case of selecting an emotion effect from just the viewer emotion, an emotion effect that imparts an exciting effect may be selected accidentally even for teasing comments input by a viewer, and thus expressing excitement and emotion interactively has been difficult.

Specifically, when the performer is singing, comments of applause input by a viewer before or partway through the chorus of the sing may be "teasing". In contrast, comments of applause input by a viewer immediately after the performer finishes singing the chorus express "inspiration". In this way, by recognizing the state of the performer on the basis of input from the performer (in the case of a song, the performer's voice), it is possible to select an emotion effect that imparts an effect more consistent with the situation.

Furthermore, for example, emotions and facial expressions that express the performer's level of excitement may be input, and the performer-side information processing device 13A may determine whether or not comments from viewers are input in correspondence with the progression of excitement in the performer's emotions and facial expressions, and thereby generate further excitement in the performance at that moment.

Note that besides comments, information such as a viewer's speech or sound pressure, heart rate, and facial expressions may also be used as viewer information, for example, and viewer emotion may be estimated accurately on the basis of these multiple types of viewer information. Additionally, an overall viewer emotion with respect to a moving image may be estimated on the basis of the viewer information for multiple people.

As an example, FIG. 7 will be referenced to describe an example of selecting a background effect on the basis of the intensity of viewer laughter in the performer-side information processing device 13.

For example, in the distribution system 11, viewer laughter computed by imaging viewers with an imaging device provided in the viewer-side information processing devices 15-1 to 15-N may be transmitted. Subsequently, in the performer-side information processing device 13, the viewer information acquisition unit 31 acquires the laughter transmitted from the viewer-side information processing devices 15-1 to 15-N as viewer information, and the emotion effect selection unit 33 selects a background effect on the basis of the intensity of the viewer laughter.

Specifically, the emotion effect selection unit 33 makes a determination in accordance with the intensity of viewer laughter. For example, as illustrated in FIG. 7, even if the performer makes the same funny face, a background effect that generates excitement is selected if the intensity of viewer laughter is high, whereas a background effect that casts a chill over the situation is selected if the intensity of viewer laughter is low. Furthermore, the emotion effect selection unit 33 may also display effect text in accordance with the intensity of viewer laughter, in which effect text that generates excitement is displayed if the intensity of viewer laughter is high, whereas effect text that casts a chill over the situation is displayed if the intensity of viewer laughter is low.

In this way, in the performer-side information processing device 13, it is possible to select a more optimal background effect on the basis of not only recognizing viewer emotion, but also on the basis of the intensity of viewer laughter. Note that besides the intensity of laughter, information such as the duration of laughter, the number of laughing viewers, the loudness of the laughter, and comments supplied together with laughter may also be used to make a laughter determination. For example, in the case in which the viewer information includes information indicating that a viewer is laughing, the emotion effect selection unit 33 may select an effect with a more fun result if the viewer laughs for a long time on the basis of the information. Additionally, in the performer-side information processing device 13, the manner of the background effect may be modified in accordance with the properties of the laughter, such as a sudden unexpected laugh or a loud burst of laughter, for example.

Figure 8:
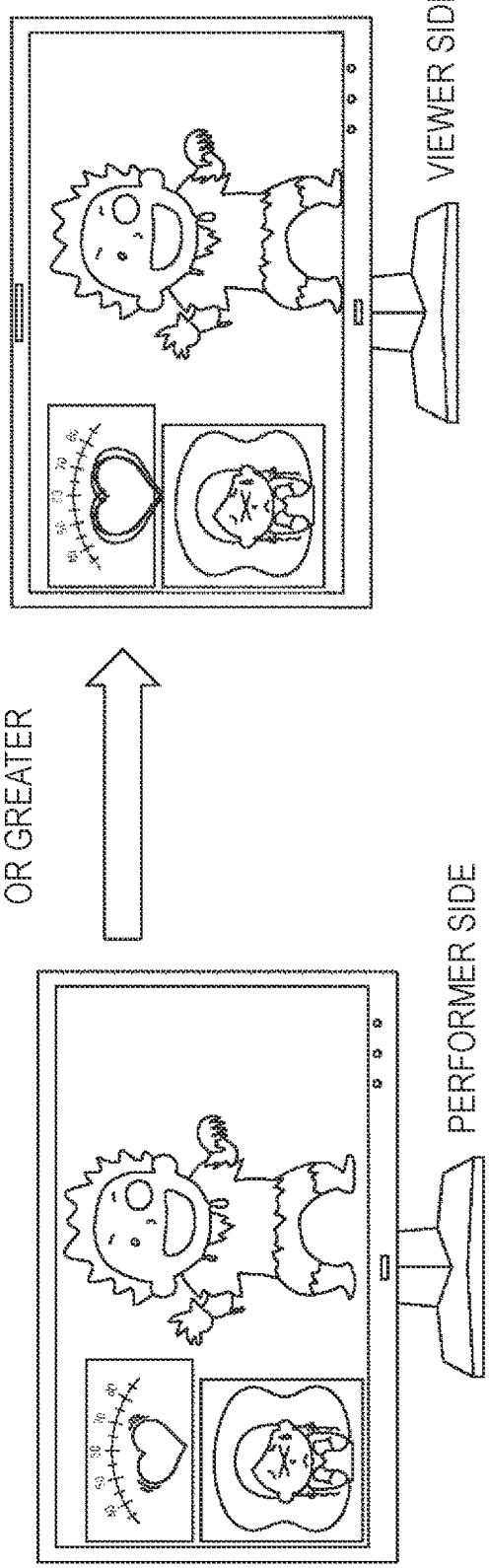
FIG. 8 is a diagram explaining interaction using the heart rates of a viewer and a performer.

Next, FIG. 8 will be referenced to describe an interaction using performer and viewer heart rates in the performer-side information processing device 13A.

For example, in the distribution system 1, the heart rates of viewers may be acquired and transmitted by a heart rate sensor provided in the viewer-side information processing devices 15-1 to 15-N. Similarly, the performer-side information processing device 13A is able to acquire the heart rate of the performer with the input unit 26 (for example, an armband-style or ear clip-style heart rate meter). As another example, a viewer or the performer may be imaged by an imaging device, and the heart rate may be computed from the image.

FIG. 8 illustrates an example of distributing a game screen from a game that the performer is playing, in which a performer avatar is displayed in the lower-left of the game screen, and a meter based on heart rate is displayed in the upper-left of the game screen. This meter is based on both the heart rates of viewers and the heart rate of the performer, and as the variation in these heart rates become more in tune with each other, an effect expressing greater empathy is displayed.

For example, if the level of excitement and empathy between performer and viewer becomes equal to or greater than a prescribed value, the effect becomes one in which a heartbeat mark displayed on the meter throbs greatly. Additionally, if the heart rate is designed to be linked to the control of the game, a special attack may be produced when the level of excitement and empathy between performer and viewer becomes equal to or greater than a prescribed value. Also, a change may be produced in the performer avatar displayed in the lower-left of the game screen.

In this way, in the performer-side information processing device 13A, the interactivity between performer and viewer may be enhanced further, on the basis of not only recognizing performer and viewer emotion, but also the level of excitement and empathy between performer and viewer computed from heart rates. Note that besides the heart rate of a viewer, information such as a face image, speech, sound pressure, or button tapping may also be used as viewer information from which the level of excitement may be acquired.

Note that the foregoing embodiments describe effects drawn onto a moving image, but besides visual effects, the performer-side information processing device 13A may also distribute sound effects based on performer and viewer emotion together with a moving image, for example, and add various other types of effects. Additionally, the performer-side information processing device 13A may display an object based on performer and viewer emotion (for example, a stamp or balloon) in the moving image. These object-based effects may be added without distinguishing between performer and background, and may be composited in the foreground in a portion other than the performer's face, for example. Furthermore, the performer-side information processing device 13A may also forcibly end distribution of a moving image if a level indicating the degree of viewer arousal falls, or if a level indicating the degree of unpleasant viewer emotion rises, for example.

In addition, the performer-side information processing device 13 may change an effect drawn onto a moving image depending on not only viewer emotion, but also the number of viewers. If the number of viewers reaches a fixed number or more, the performer-side information processing device 13 may change to a flashier effect, whereas if the number of viewers is extremely small, the performer-side information processing device 13 may remove the effect. Additionally, the performer-side information processing device 13 may also add a specific effect, change an added effect, or remove an added effect in accordance with the number of times specific viewer information is input from multiple viewers, such as the number of times a specific comment meaning "laughter" or "applause" is input, for example. Furthermore, the performer-side information processing device 13A may also be configured to distribute a moving image in which a special effect is drawn only for viewers who input viewer information more actively. In other words, instead of distributing the same moving image to all viewers, the effect in the moving image distributed to each viewer may be changed in accordance with the viewer's reaction.

Furthermore, the present embodiment describes an example in which the process of adding an effect is conducted in the performer-side information processing device 13, but the performer-side information processing device 13 may conduct just a process of transmitting a moving image of the performer, and the process of adding an effect on the basis of viewer information may be conducted in the distribution server 14, for example. Alternatively, the process may be divided up between the performer-side information processing device 13 and the distribution server 14.

It should be noted that each process described referring to the flowchart above includes a process that is not necessarily performed in a time series manner in the order described in the flowchart, but may be performed in a parallel or individual manner (for example, a paralleled process or a process by objects). In addition, the program may be processed by one CPU, or processed by a plurality of CPUs in a distributed manner.

The above-described series of processing (an information processing method) may be performed by hardware or may be performed by software. When the series of processing is performed by software, a program forming the software is installed into a computer that is incorporated in a dedicated hardware, or installed from a program storage medium on which programs are recorded into a general-purpose personal computer, for example, that can perform various types of functions by installing various types of programs.

Figure 9:
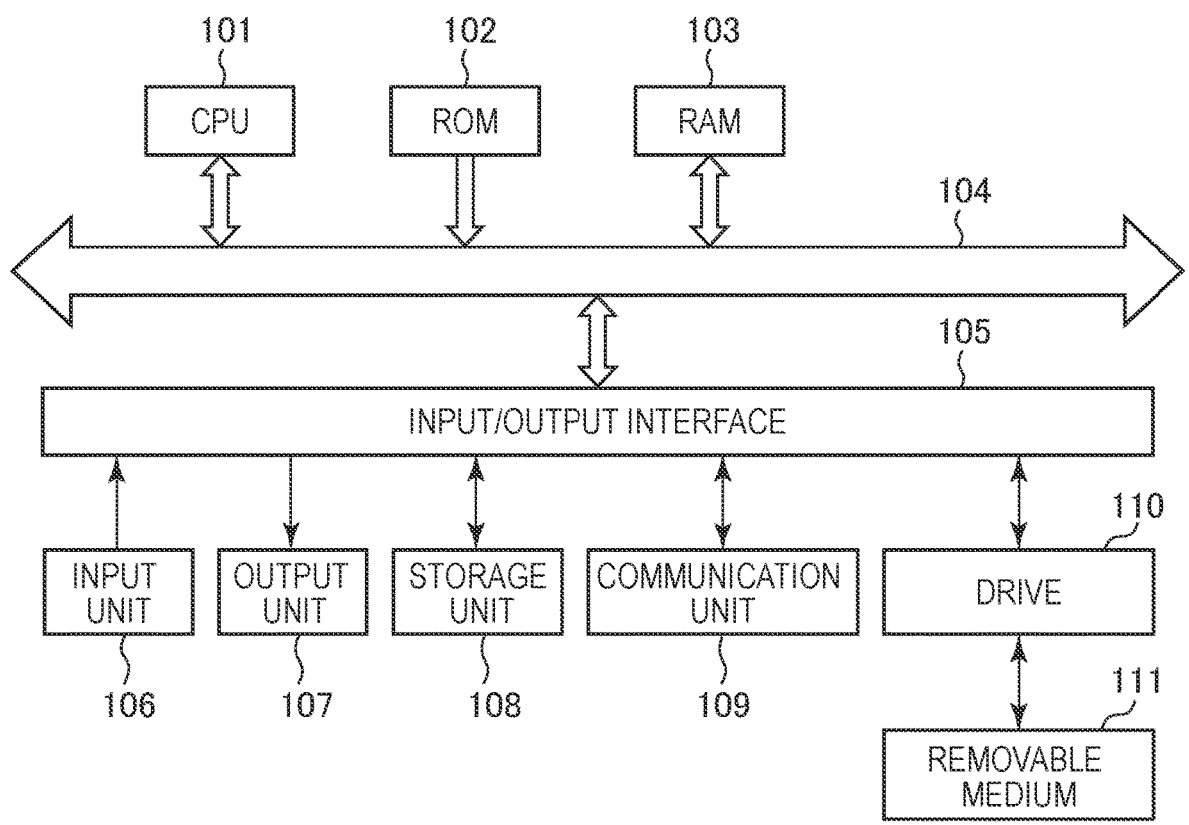
FIG. 9 is a block diagram illustrating an exemplary configuration of an embodiment of a computer applying the present technology.

FIG. 9 is a block diagram illustrating an exemplary hardware configuration of a computer that executes the foregoing series of operations according to a program.

In the computer, a central processing unit (CPU) 101, read-only memory (ROM) 102, and random access memory (RAM) 103 are connected to each other by a bus 104.

Additionally, an input/output interface 105 is connected to the bus 104. Connected to the input/output interface 105 are an input unit 106 that may include devices such as a keyboard, mouse, and microphone, an output unit 107 that may include devices such as a display and one or more speakers, a storage unit 108 that may include devices such as a hard disk and non-volatile memory, a communication unit 109 that may include a device such as a network interface, and a drive 110 that drives a removable medium 111 such as a magnetic disk, optical disc, magneto-optical disc, or semiconductor memory.

In a computer configured as above, the foregoing series of operations are conducted due to the CPU 101 loading a program stored in the storage unit 108 into the RAM 103 via the input/output interface 105 and the bus 104, and executing the program, for example.

The program executed by the computer (CPU 101) may be provided by being recorded onto the removable medium 111 as an instance of packaged media such as magnetic disks (including flexible disks), optical discs (including Compact Disc-Read-Only Memory (CD-ROM) and Digital Versatile Disc (DVD)), magneto-optical discs, or semiconductor memory. Alternatively, the program may be provided via a wired or wireless transmission medium such as a local area network, the Internet, or satellite broadcasting.

Additionally, the program may be installed to the storage unit 108 via the input/output interface 105 by inserting the removable medium 111 into the drive 110. The program may also be received by the communication unit 109 via a wired or wireless transmission medium, and installed to the storage unit 108. Otherwise, the program may be preinstalled in the ROM 102 or the storage unit 108.

Additionally, the present technology may also be configured as below.

(1)

An information processing device, including:

a viewer information acquisition unit that acquires specific viewer information input from a viewer who views a distributed moving image; and a control unit that controls an addition of an effect based on the viewer information acquired by the viewer information acquisition unit.

(2)

The information processing device according to (1), further including:

a performer information acquisition unit that acquires performer information from a performer who performs in the moving image.

(3)

The information processing device according to (2), further including:

an emotion recognition unit that recognizes an emotion on a basis of at least one of the viewer information and the performer information.

(4)

The information processing device according to (3), wherein
the control unit selects the effect on a basis of an emotion of the viewer or an emotion of the performer recognized by the emotion recognition unit.

(5)

The information processing device according to (3), wherein
the control unit selects the effect on a basis of both an emotion of the viewer and an emotion of the performer recognized by the emotion recognition unit.

(6)

The information processing device according to any one of (1) to (5), wherein
the effect selected by the control unit includes at least one of an effect composited behind the performer, an effect added without distinguishing between the performer and a background, an effect composited in front of a face of the performer, and an effect composited in front of the performer.

(7)

The information processing device according to any one of (1) to (6), wherein
the viewer information includes at least one of a comment input by the viewer, a facial expression of the viewer, speech information about speech spoken by the viewer, and an operation speed or an operation count of an operation performed by the viewer on a certain operating device.

(8)

The information processing device according to any one of (1) to (7), wherein
the viewer information includes an intensity of laughter by the viewer, and
the control unit controls the addition of the effect in accordance with the intensity of laughter by the viewer.

(9)

The information processing device according to any one of (1) to (8), wherein
the viewer information includes information indicating that the viewer is laughing, and
the control unit controls the addition of the effect in accordance with how long the viewer smiles or laughs.

(10)

The information processing device according to any one of (1) to (9), wherein
the control unit controls the addition of the effect on a basis of the viewer information from a plurality of the viewers.

(11)

The information processing device according to (10), wherein
the control unit adds the effect, and controls a modification or a removal of the added effect in accordance with a number of times specific viewer information is input from the plurality of viewers.

(12)

The information processing device according to any one of (1) to (11), wherein
the viewer information includes a heart rate of the viewer, the performer information includes a heart rate of the performer, and
the control unit controls the addition of the effect on a basis of both the heart rate of the viewer and the heart rate of the performer.

(13)

An information processing method, including:
acquiring specific viewer information input from a viewer who views a distributed moving image; and
controlling an addition of an effect based on the acquired viewer information.

(14)

A program causing a computer to execute information processing including:
acquiring specific viewer information input from a viewer who views a distributed moving image; and
controlling an addition of an effect based on the acquired viewer information.

Note that the present embodiment is not limited to the embodiment discussed above, and various modifications are possible within a scope that does not depart from the gist of the present disclosure.

REFERENCE SIGNS LIST 11 distribution system
12 network
13 performer-side information processing device
14 distribution server
15-1 to 15-N viewer-side information processing device
21 communication unit
22 imaging unit
23 display unit
24 storage unit
25 image processing unit
26 input unit
31 viewer information acquisition unit
32 viewer emotion recognition unit
33 emotion effect selection unit
34 background effect drawing unit
35 face effect drawing unit
36 performer emotion recognition unit

The invention claimed is:

1. An information processing device, comprising: circuitry configured to:
acquire performer information associated with a performer who performs in a distributed moving image;
acquire viewer information input from a plurality of viewers who view the distributed moving image, the viewer information including a reaction to the performer information by each of the plurality of viewers;
control an effect to be added to a distributed moving image, based on the reactions to the performer information by the plurality of viewers; and
control a modification of the effect in accordance with whether or not a number of viewers who view the distributed moving image exceed a predetermined number.

2. The information processing device according to claim 1, wherein the circuitry is further configured to:
recognize an emotion based on at least one of the viewer information or the performer information.

3. The information processing device according to claim 2, wherein the circuitry is further configured to:
select the effect based on emotions of the plurality of viewers or an emotion of the performer.

4. The information processing device according to claim 2, wherein the circuitry is further configured to:
select the effect based both on emotions of the plurality of viewers and an emotion of the performer.

5. The information processing device according to claim 1, wherein the effect to be added includes at least one of an effect composited behind the performer, an effect added without distinguishing between the performer and a background, an effect composited in front of a face of the performer, or an effect composited in front of the performer.

6. The information processing device according to claim 1, wherein
the viewer information further includes at least one of a comment input by a viewer of the plurality of viewers, a facial expression of the viewer, speech information about speech spoken by the viewer, or an operation speed or an operation count of an operation performed by the viewer on a certain operating device.

7. The information processing device according to claim 1, wherein
the viewer information includes an intensity of laughter by a viewer of the plurality of viewers, and
the circuitry is further configured to:
control a selection of the effect in accordance with the intensity of laughter by the viewer.

8. The information processing device according to claim 1, wherein
the viewer information includes information indicating that a viewer of the plurality of viewers is laughing, and
the circuitry is further configured to:
control a selection of the effect in accordance with how long the viewer smiles or laughs.

9. The information processing device according to claim 1, wherein the circuitry is further configured to:
add the effect to the distributed moving image; and
control a modification or a removal of the added effect in accordance with a number of times viewer information is input from the plurality of the viewers.

10. The information processing device according to claim 1, wherein the viewer information includes a heart rate of a viewer of the plurality of viewers, the performer information includes a heart rate of the performer, and the circuitry is further configured to:
control a selection of the effect on a basis of both the heart rate of the viewer and the heart rate of the performer.

11. The information processing device according to claim 1, wherein
the effect includes an effect composited in front of the performer in the distributed moving image.

12. The information processing device according to claim 1, wherein
the effect includes a background effect displayed behind the performer in the distributed moving image.

13. The information processing device according to claim 1, wherein
the performer information includes an input by the performer.

14. The information processing device according to claim 1, wherein the effect when the viewer information matches with the performer information is bigger than the effect when the viewer information does not match with the performer information.

15. An information processing method, comprising:
acquiring performer information associated with a performer who performs in a distributed moving image;
acquiring viewer information input from a plurality of viewers who view the distributed moving image, the viewer information including a reaction to the performer information by each of the plurality of viewers;
controlling an effect to be added to a distributed moving image, based on the reactions to the performer information by the plurality of viewers; and
controlling a modification of the effect in accordance with whether or not a number of viewers who view the distributed moving image exceed a predetermined number.

16. A non-transitory computer-readable medium having embodied thereon a program, which when executed by a computer causes the computer to execute a method, the method comprising:
acquiring performer information associated with a performer who performs in a distributed moving image;
acquiring viewer information input from a plurality of viewers who view the distributed moving image, the viewer information including a reaction to the performer information by each of the plurality of viewers;
controlling an effect to be added to a distributed moving image, based on the reactions to the performer information by the plurality of viewers; and
controlling a modification of the effect in accordance with whether or not a number of viewers who view the distributed moving image exceed a predetermined number.

17. The information processing device according to claim 1, wherein the reactions to the performer information include the reactions by at least two viewers of the plurality of viewers.

18. The information processing device according to claim 1, wherein the effect is a single image.

19. The information processing device according to claim 1, wherein the circuitry is further configured to:
control, when the number of viewers who view the distributed moving image exceeding the predetermined number, the modification of the effect so that the effect is bigger than the effect when the number of viewers who view the distributed moving image does not exceed the predetermined number.

20. The information processing device according to claim 1, wherein the circuitry is further configured to:
control, when the number of viewers who view the distributed moving image not exceeding the predetermined number, the modification of the effect by removing the effect.

* * * * *